JOHN W. HARD.
Improvement in Car Axles.
No. 125,046.  Patented March 26, 1872.
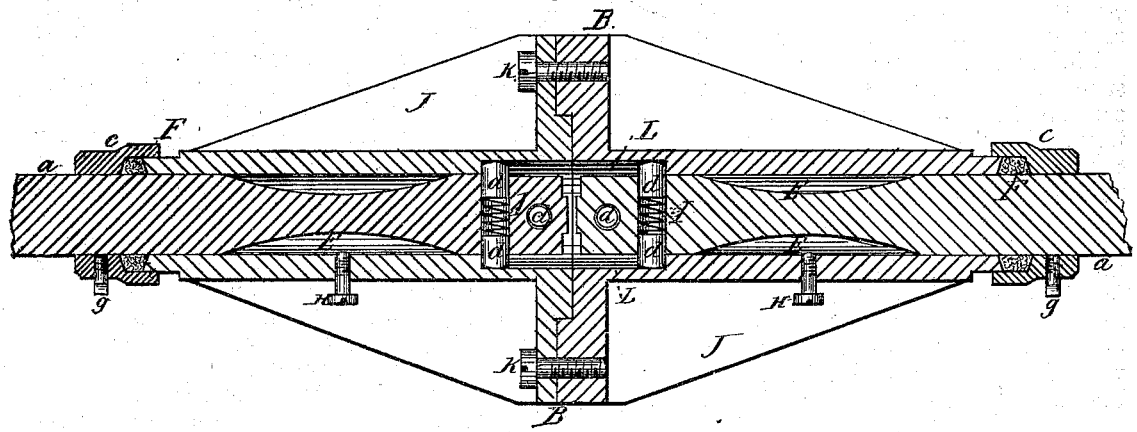
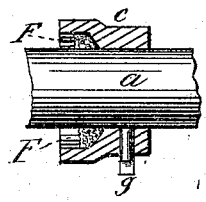
Witnesses.  
William B. Cleve  
Herbert Clive
Inventor:  
John W. Hard 125,046

UNITED STATES PATENT OFFICE.

JOHN W. HARD, OF DECORAH, IOWA.

IMPROVEMENT IN CAR-AXLES.

Specification forming part of Letters Patent No. 125,046, dated March 26, 1872.

SPECIFICATION.

JOHN W. HARD, of Decorah, in the county of Winneshiek and State of Iowa, has invented certain Improvements in Divided Car-Axles, of which the following is a specification:

This is an improvement upon a patent issued to me March 28, 1865, No. 47,015; and consists, first, in attaching stuffing-boxes rigidly to the axles at each end of the couplings. Second, of fixing two pairs of friction-plugs at right angles to each other through the inner ends of each half of the axles. Each pair of plugs is acted upon by a single spring between them, pressing them out against a smooth surface in the coupling. Third, turning down the axles between the inner ends of the half-axles and the stuffing-boxes sufficient to receive the vibration, and thus obviate the danger of axles breaking at the wheel.

*Description of the Accompanying Drawing.*

Figure 1 is a cross-section, showing those parts of the axles with the couplings, stuffing-boxes, and the friction-plugs, in outline. Fig. 2 is a view of stuffing-box in section, with set-screws.

Like letters refer to same parts.

In the annexed drawing, *a a* represent my axle, which is made in two parts, so that either may turn independent of the other. Each section of the axle is passed through a sleeve, which is also made in two parts, and forms the coupling B for the axle sections. This coupling is provided with exterior wings J, for giving strength without extra metal, and the faces of the coupling are turned to fit each other, so as to keep them in line. K represents the bolts which secure the parts of the coupling together.

It will be seen that sleeves of each section of the coupling B are enlarged where the two parts come together, and by this means a circumferential shoulder is formed near the inner end of each of the axles.

*d d* represent the friction-plugs, which are attached (two pairs to each axle) to the inner ends of the axles at right angles to each other. These plugs each rest upon a spring, I, by which means they are forced out from their axles and act against a smooth surface on the coupling against the shoulders in the sleeve, as seen in Fig. 1. C C represent the stuffing-boxes, which surround the axles *a a* at their outer extremities. The inner part of each box is enlarged, as shown, and filled with a suitable packing, F, of hemp or other substance, against which the outer ends of the coupling bear. The boxes C are held to the axle by set-screws *g*, and extend over each end of the coupling, as shown. These boxes C C and the friction-plugs *d d* prevent any end play, and secure the two halves of the axle in their proper positions. The axles *a a*, between the friction-plugs and the stuffing-boxes, are each reduced in circumference (at E E) sufficient to receive the vibrations, obviate the breaking of the axles at the wheel, and form oil-chambers, with which communication is had by means of the screws H.

What I claim, and desire to secure by Letters Patent, is—

1. The combination, with two axles, *a a*, and the coupling B, of the stuffing-boxes C C, resting over the ends of the coupling, and secured to the axle by the set-screws *g g*, all substantially as and for the purposes herein set forth.

2. In combination with an axle made in two parts, secured by a coupling, B, the friction-plugs *d d*, resting on springs, and acting against the smooth surface in the coupling, all substantially as and for the purposes herein set forth.

JOHN W. HARD.

Witnesses:
WILLIAM B. CLIVE,
HERBERT CLIVE.